US008928865B2

(12) United States Patent
Rakuljic

(10) Patent No.: US 8,928,865 B2
(45) Date of Patent: Jan. 6, 2015

(54) THREE-DIMENSIONAL TOMOGRAPHIC IMAGING CAMERA

(75) Inventor: George Rakuljic, Santa Monica, CA (US)

(73) Assignee: Telaris, Inc., Santa Monica, CA (US)

( * ) Notice: Subject to any disclaimer, the term of this patent is extended or adjusted under 35 U.S.C. 154(b) by 219 days.

(21) Appl. No.: 13/566,962

(22) Filed: Aug. 3, 2012

(65) Prior Publication Data

US 2013/0044311 A1 Feb. 21, 2013

Related U.S. Application Data

(60) Provisional application No. 61/524,184, filed on Aug. 16, 2011.

(51) Int. Cl.
*G01C 15/02* (2006.01)
*G01C 15/00* (2006.01)
*G01S 17/32* (2006.01)
*G01S 17/89* (2006.01)

(52) U.S. Cl.
CPC ............. *G01C 15/002* (2013.01); *G01S 17/325* (2013.01); *G01S 17/89* (2013.01)
USPC ....... 356/5.09; 356/3.01; 356/4.01; 356/5.01; 356/5.1

(58) Field of Classification Search
CPC ... G02F 1/0121; G02F 2203/50; G01S 7/487; G01S 17/10; G01C 3/08
USPC ............. 356/3.01–3.15, 4.01–4.1, 5.01–5.15, 356/6–22, 28, 28.5
See application file for complete search history.

(56) References Cited

U.S. PATENT DOCUMENTS

| 5,877,851 | A | 3/1999 | Stann et al. |
|---|---|---|---|
| 6,100,517 | A | 8/2000 | Yahav et al. |
| 6,233,085 | B1 * | 5/2001 | Johnson ........................ 359/279 |
| 6,844,924 | B2 | 1/2005 | Ruff et al. |
| 7,088,454 | B2 | 8/2006 | Chang et al. |
| 2004/0100637 | A1 * | 5/2004 | Teich et al. ................... 356/497 |
| 2012/0257187 | A1 * | 10/2012 | Stutz et al. ................... 356/5.01 |
| 2013/0107274 | A1 * | 5/2013 | Vertikov et al. ............... 356/479 |

OTHER PUBLICATIONS

Dubey et al., Fingerprint detection using full-field swept-source optical coherence tomography, Applied Physics Letters 91, 181106 (2007).
Marron et al., Three-dimensional imaging using a tunable laser source, Opt. Eng. 39(1) 47-51 (Jan. 2000).
Simpson et al., Coherent imaging with two-dimensional focal-plane arrays: design and applications, Applied Optics, vol. 36, No. 27, pp. 6013-6020, (Sep. 20, 1997).
Marrion, et al., Holographic laser radar, Optics Letters, vol. 18, No. 5, pp. 385-387 (Mar. 1, 1993).

* cited by examiner

*Primary Examiner* — Luke Ratcliffe
(74) *Attorney, Agent, or Firm* — William A Blake

(57) ABSTRACT

A detection apparatus and method for FMCW LIDAR employ signals whose frequencies are modified so that low-cost and low-speed photodetector arrays can be employed for range detection. The LIDAR includes a single mode swept frequency laser (SFL), whose optical frequency is varied with time, as a result of which, a target beam reflected back by the target is shifted in frequency from a reference beam by an amount that is proportional to the relative range z to the target. The reflected target beam is combined with the reference beam and detected by the photodetector array. The difference between the frequencies of the reflected target beam and the reference beam is reduced to a level that is within the bandwidth of the photodetector array by first modulating the target and/or reference beam.

22 Claims, 6 Drawing Sheets

THREE-DIMENSIONAL TOMOGRAPHIC IMAGING CAMERA

CROSS REFERENCE TO RELATED APPLICATIONS

This application claims the benefit under 35 USC 119(e), of U.S. Provisional Application No. 61/524,184, filed Aug. 16, 2011, which is hereby incorporated by reference in its entirety.

BACKGROUND OF THE INVENTION

1. Field of the Invention

The present invention relates in general to a full-field three-dimensional imaging apparatus and method using a tomographic imaging camera in conjunction with a swept-frequency laser source. This approach is based on the one-shot acquisition of entire two-dimensional (2-D) (x,y) tomographic slices (with a fixed z) at very fast speeds, but uses readily available low-speed detector arrays such as CCD or CMOS cameras.

2. Description of the Background Art

Frequency modulated continuous wave (FMCW) reflectometry has emerged as a very important technique in a variety of applications including LIDAR [1], biomedical imaging [2, 3], biometrics [4], and non-contact profilometry [5]. This is due to unique advantages of the FMCW approach such as a high dynamic range and simple data acquisition that does not require high-speed electronics [6]. The basic principle of FMCW LIDAR is as follows. The optical frequency of a single mode laser is varied linearly with time, with a slope $\xi$. The output of the laser impinges on a target and the reflected signal is mixed with a part of the laser output in a photodetector (PD). If the relative delay between the two light paths is $\tau$, the PD output is a sinusoidal current with frequency $\xi\tau$. The distance to the target (or "range") $\tau$ is determined by taking a Fourier transform of the detected photocurrent. Reflections from multiple targets at different depths result in separate frequencies in the photocurrent.

The important metrics of an FMCW system are the linearity of the swept source—a highly linear source eliminates the need for post-processing of acquired data—and the total chirp bandwidth B which determines the range resolution. A high-resolution FMCW LIDAR or imaging system has two important components: i) a broadband swept-frequency laser (SFL) for high axial resolution; and ii) a technique to translate the one-pixel measurement laterally in two dimensions to obtain a full 3-D image.

State of the art SFL sources for biomedical and other imaging applications are typically mechanically tuned external cavity lasers where a rotating grating tunes the lasing frequency [2, 7, 8]. Fourier-domain mode locking [9] and quasi-phase continuous tuning [10] have been developed to further improve the tuning speed and lasing properties of these sources. However, all these approaches suffer from complex mechanical embodiments that limit their speed, linearity, coherence, size, reliability and ease of use and manufacture.

Detectors for 3-D imaging typically rely on the scanning of a single pixel measurement across the target to be imaged [11]. This approach requires a complex system of mechanical scanning elements to precisely move the optical beam from pixel to pixel, which severely limits the speed of image acquisition. It is therefore desirable to eliminate the requirement for mechanical scanning, and obtain the information from the entire field of pixels in one shot. To extend the FMCW technique to a detector array, the frequencies of the photocurrents from each detector in the array should be separately calculated. However, in a high-axial-resolution system, each detector in the array measures a beat signal typically in the MHz regime. A large array of high speed detectors therefore needs to operate at impractical data rates (~THz) and is prohibitively expensive. For this reason, there are no practical full-field FMCW LIDAR imaging systems, except some demonstrations with extremely slow scanning rates [4, 11] or expensive small arrays [12].

An ideal FMCW LIDAR system will therefore consist of a broadband rapidly tuned SFL, and a detection technique that is capable of measuring the lateral extent of the object in one shot. The system will be inexpensive, robust, and contain no moving parts.

Previously, a novel optoelectronic SFL source has been developed [13] based on the tuning of the frequency of a semiconductor laser via its injection current. Using a combination of open loop predistortion and closed loop feedback control of the laser current, the SFL generates extremely linear and broadband optical chirps. The starting frequency and slope of the optical chirp are locked to, and determined solely by, an electronic reference oscillator—they are independent of the tuning characteristics of the laser. Chirp bandwidths of 1 THz at chirp speeds exceeding $10^{16}$ Hz/s have been demonstrated, and it has been shown that arbitrary optical chirp shapes can be electronically generated. The optoelectronic SFL source is compact and robust, has low phase noise and large chirp bandwidth, and has no moving parts. Efforts are underway to develop this chirped laser on an integrated chip platform. A need still remains, however, for a FMCW LIDAR detection apparatus and method that can employ low cost low-speed detectors with such a high bandwidth SFL.

SUMMARY OF THE INVENTION

The present invention addresses the foregoing need through provision of a new detection approach for FMCW LIDAR, in which the frequencies of the signals employed by the apparatus are modified in such a manner that low-cost and low-speed photodetector arrays, such as CCD or CMOS cameras, can be employed in the construction of a tomographic imaging camera (TomICam). The approach obviates the need for high-speed detector arrays for full-field imaging, and thus leads to a practical approach to measure FMCW LIDAR signals on an array of pixels in parallel.

In each embodiment of the invention, a conventional FMCW LIDAR is employed that has been modified to incorporate the concepts of the present invention. The LIDAR is designed to measure the distance or range z to a target and includes a single mode swept frequency laser (SFL), which is preferably linear and generates a laser beam that is directed as a launched beam through an interferometer. The interferometer splits the launched laser beam through a first, target arm to the target, whose range is to be determined, and through a second, reference arm. During this process, the optical frequency of the SFL is varied with time, as a result of which, the beam which is reflected back by the target is shifted in frequency from the reference beam by an amount that is proportional to the relative range or distance z to the target. The reflected target beam is combined with the reference beam and received as input to a photodetector (PD). If the relative delay between the target beam path and the reference beam path is $\tau$, the PD output is a sinusoidal current with frequency $\xi\tau$. The distance to the target (or "range") $\tau$ can be determined by taking a Fourier transform of the detected photocurrent.

Reflections from multiple targets at different depths result in separate frequencies in the photocurrent.

Unfortunately, in the case of low-cost and low-speed photodetector arrays such as CCD or CMOS cameras, which have effective bandwidths in the Hz range (i.e. near zero or DC), the difference in frequencies between the reflected target beam and the reference beam is too large to be detected. However, by first modulating or translating the frequency of at least one of the beams such that the difference between the frequencies of the reflected and reference beams is reduced to a level that is within the bandwidth of the detector array, the need for high-speed detector arrays for full-field imaging is obviated.

The key insight is thus that the measurement of the photocurrent frequency, which determines the distance to the illuminated object or target imaged by a detector array pixel, can be moved to a lower frequency by modulating the optical frequency of at least one arm of the interferometer (e.g., the reference arm or the "Local Oscillator" (LO) arm) using an optical frequency shifter, for example. By using a low-speed photodetector, which effectively acts as a low pass DC filter, all components other than the DC term are filtered out, leaving only the detected value which is proportional to the square root of the reflectivity of the target at the selected range.

Thus, a single pixel measurement using the TomiCam yields the value of any target reflections present at a particular distance using a low-speed photodetector. An array of low-speed photodetectors, such as a CCD or a CMOS camera, can therefore be used to image a lateral two-dimensional "tomographic slice." In the case of a frequency shifter, by electronically varying the value of the frequency shift, tomographic slices at different depths can be obtained and combined to form a full three-dimensional image.

The foregoing frequency modulation can also be carried out using some other form of optical modulation, such as optical phase or amplitude modulation, which generate sidebands, for example, that are effectively frequency shifted versions of the original signal. The sidebands can then be used to form the required reduction in frequency difference between the reflected target beam frequency and the reference beam frequency.

A TomiCam constructed in accordance with the concepts of the present invention thus has the following important features. It is based on electronic control of the distance to the object plane. Full 3-D images are reconstructed from tomographic slices. A full-field tomographic slice is obtained in one shot, in a time that is limited only by the chirp duration. This is orders of magnitude faster than a raster-scanning solution, and enables real time imaging of moving targets. However and most importantly, the TomICam is based on low-speed CCD or CMOS cameras. Finally, the entire system comprises no moving parts or mechanical control elements, making it robust, fast, and practical.

BRIEF DESCRIPTION OF THE DRAWINGS

The features and advantages of the present invention will become apparent from the following detailed description of a number of preferred embodiments thereof, taken in conjunction with the accompanying drawings, which are briefly described as follows.

FIG. 1A is a schematic diagram of a prior art FMCW LIDAR that forms the basis for the improved FMCW LIDAR of the present invention. FIG. 1B is a graph showing the frequency of the launched (reference) and reflected beams as a function of time. FIG. 1C is a schematic illustration showing the interaction of the launched and reflected beams when they are received by the photodetector of the LIDAR.

FIG. 2A is a graph showing the frequency of the launched (reference) beam and the frequency of the reflected beam as a function of time. FIG. 2B is a schematic illustration showing the interaction of the launched and reflected beams when they are received by the photodetector of the LIDAR. The double graph of FIG. 2C shows how the Fourier transform of the selected target reflection is shifted to within the bandwidth of the TomiCam measurement by an optical frequency shifter.

DETAILED DESCRIPTION OF THE PREFERRED EMBODIMENTS

Figure 1A:
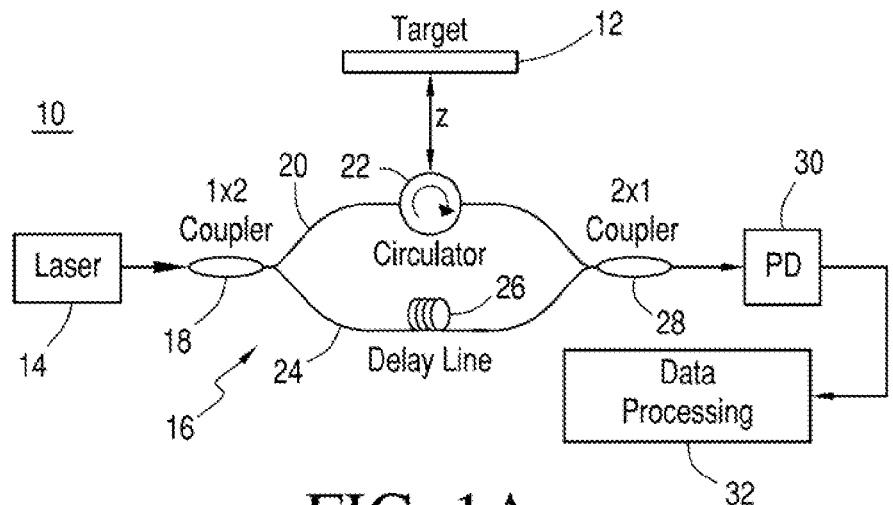
FIGS. 1A-1C illustrate the known principles of FMCW LIDAR using a linearly chirped laser source.

With reference now to a number of preferred embodiments of the present invention, FIG. 1A illustrates a conventional prior art FMCW LIDAR 10 with which the concepts of the present invention are preferably employed. The LIDAR 10 is designed to measure the distance or range z to a target 12 and includes a single mode swept frequency laser (SFL) 14 which generates a laser beam that is directed as a launched beam through an interferometer 16. The interferometer 16 includes a 1×2 coupler 18 that splits the launched laser beam through a first, target arm 20 and a circulator 22 to the target 12, and through second, reference arm 24 and a delay line 26. During this process, the optical frequency of the SFL 14 is varied linearly with time, with a slope $\epsilon$.

Figure 1B:
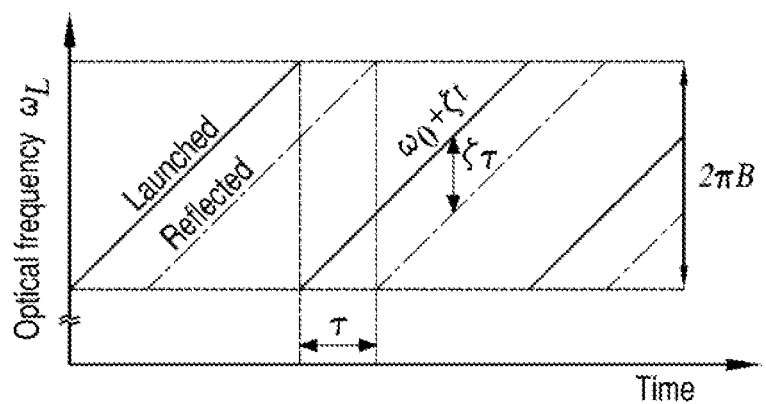
Figure 1C:
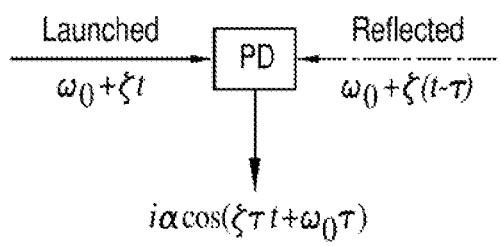

As a result and as illustrated in FIG. 1B, the beam which is reflected by the target 12 is shifted in frequency from the reference arm beam by an amount that is proportional to the range or distance z to the target 12. The frequency shifted reflected target beam is combined with the reference beam by a 2×1 coupler 28 and the two combined beams are received as input to a photodetector (PD) 30. If the relative delay between the target beam path and the reference beam path is $\tau$, the PD output is a sinusoidal current with frequency $\xi\tau$, as shown in FIG. 1C. The distance to the target (or "range") $\tau$ is determined by taking a Fourier transform of the detected photocurrent. Reflections from multiple targets at different depths result in separate frequencies in the photocurrent. These calculations are carried out by a data processing unit 32.

Figure 2A:
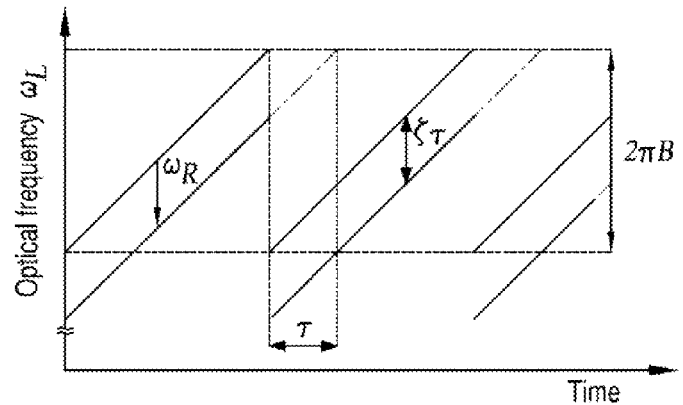
FIGS. 2A-2C graphically Illustrate the concepts of the embodiments of the present invention for a single pixel of a two-dimensional photodetector array.
Figure 2B:
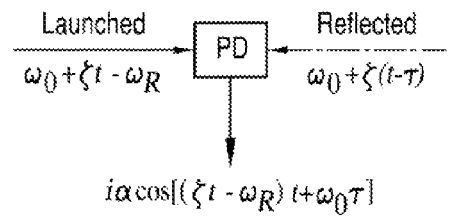
Figure 2C:
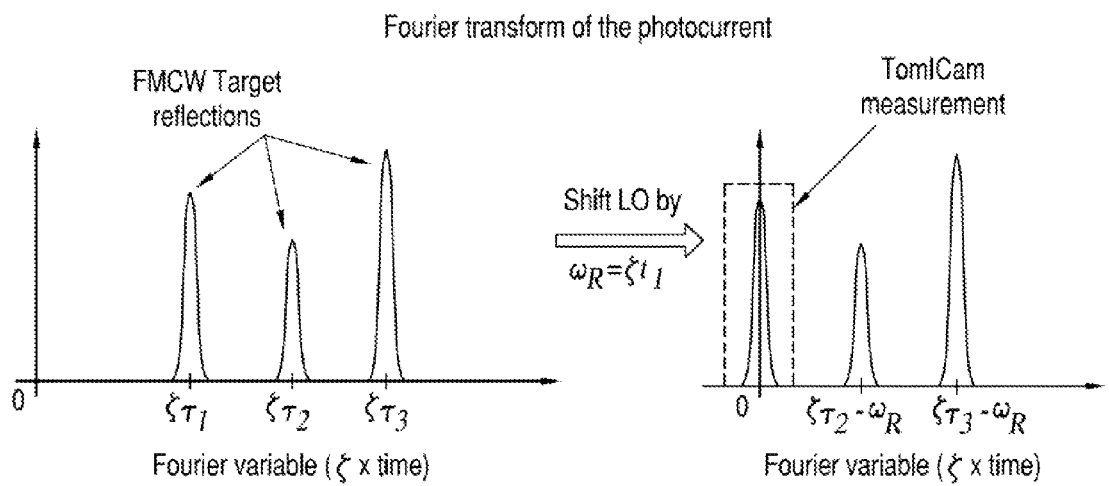

FIGS. 2A-2C graphically illustrate a new detection approach for FMCW LIDAR that is implemented by the various embodiments of the present invention and is based on low-cost and low-speed two-dimensional photodetector arrays such as CCD or CMOS cameras to construct a tomographic imaging camera (TomICam). The approach obviates the need for high-speed detector arrays for full-field imaging, and thus leads to a practical approach to measure FMCW LIDAR signals on an array of pixels in parallel.

The key insight is that the measurement of the photocurrent frequency, $\xi\tau$ in FIGS. 1B and 1C, which determines the distance to the illuminated object pixel, can be moved to a lower frequency by shifting the frequency of at least one arm (e.g. the reference arm or the "Local Oscillator" (LO) arm) of the optical chirp by a known frequency $\omega_R$ using an optical frequency shifter, for example. The use of a frequency shifter is a simple, intuitively understandable implementation of the concept. However, any modulator that generates a frequency sideband, such as an optical phase or amplitude modulator may be used instead as will be discussed later.

The beat signal from the photodetector over one chirp period is then of the form $$i_{beat} \propto \sum_i \sqrt{R_i} \cos[(\xi\tau_i - \omega_R)t + \omega_0\tau_i], \quad (1)$$

where the sum is carried out over targets at depth $\tau_i$ with reflectivities $R_i$. Let us ignore the phase term $\omega_0\tau_i$ for the time being; it will be addressed later. A low speed photodetector is used in the experiment so that it filters out all components other than the DC term in the above expression. Note that "DC" here refers to remaining constant over the duration of the chirp. DC filtering of a signal is therefore equivalent to integrating the signal over the chirp duration.

As a result, all terms i other than the target which satisfies $$\tau_{i0} = \omega_R/\xi \quad (2)$$

are rejected by the measurement, and the detected value is proportional to the square root of the reflectivity of the target at $\tau_{i0}$. This is depicted schematically in FIG. 2C.

As described above, a single pixel Tomographic imaging camera measurement yields the value of any target reflections present at a particular distance $\tau_{i0}$, (we will refer to a distance $c\tau_{i0}$ as $\tau_{i0}$.) using a low-speed photodetector. An array of low-speed photodetectors, such as a CCD or a CMOS camera, can therefore be used to image a lateral two-dimensional "tomographic slice." By electronically varying the value of the frequency shift $\omega_R$, tomographic slices at different depths can be obtained and combined to form a full three-dimensional image.

Figure 3:
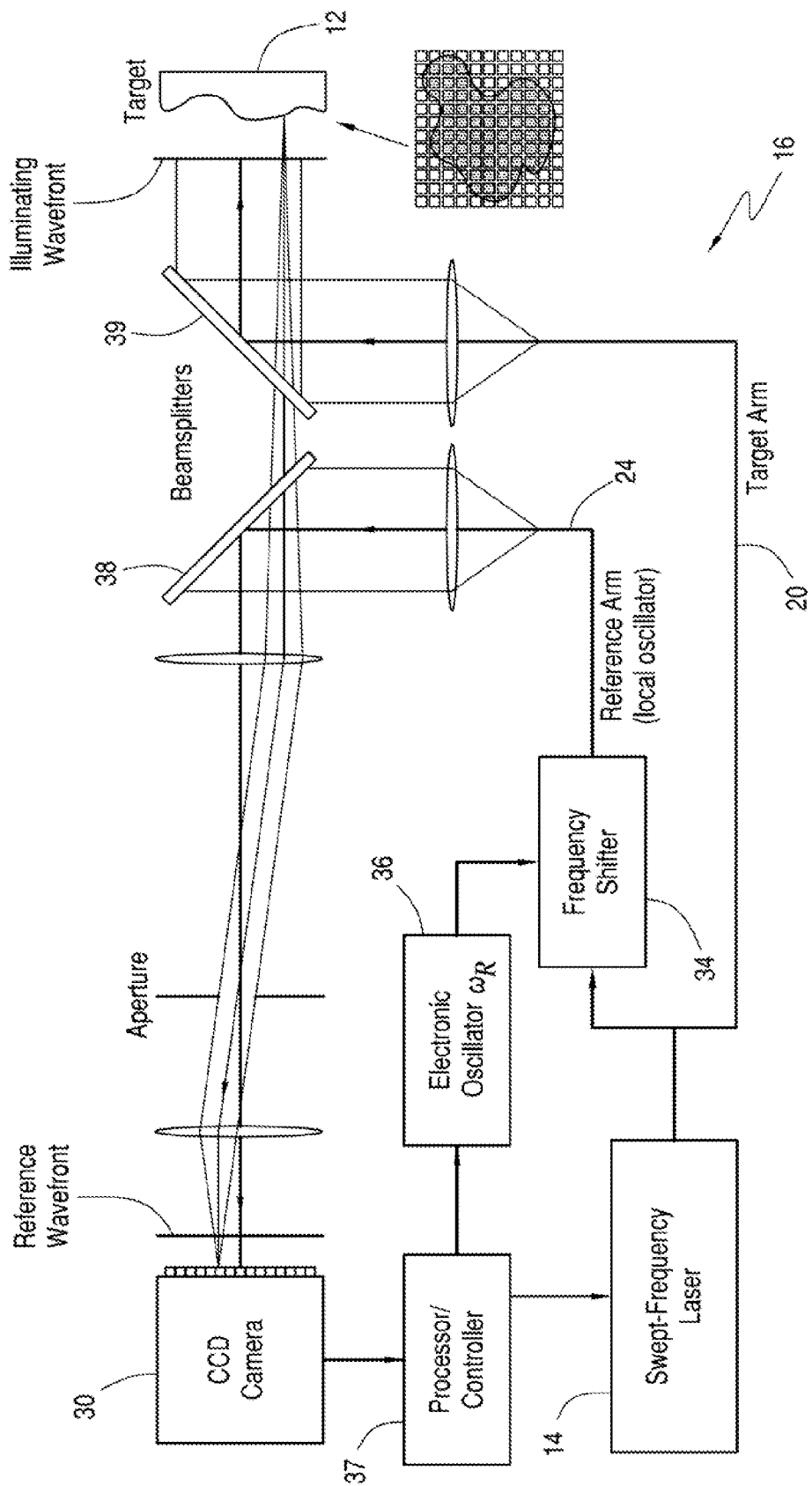
FIG. 3 is a schematic illustration of an implementation of a TomICam three-dimensional imaging system in accordance with an embodiment of the present invention that employs the frequency shifter concepts of FIGS. 2A-2C.

FIG. 3 illustrates a modification of the FMCW LIDAR 10 of FIG. 1A which implements the foregoing concepts of the present invention. In this embodiment, a frequency shifter 34 is disposed in the reference arm 24 (also referred to as the local oscillator or LO arm) of the interferometer 16 and shifts the optical frequency of the reference beam in accordance with an input from an electronic oscillator 36. A processor/controller 37 is provided which makes the necessary range determination calculations based on the output of the CCD Camera 30 and controls the chirping operation of the SFL 14. In addition, the processor/controller 37 controls operation of the frequency shifter 34 through the electronic oscillator 36. The beams in the target and reference arms 20 and 24 are directed through first and second beamsplitters 38 and 39 to the target 12 and the CCD camera (photodetector or PD) 30, respectively. The reflected beam from the target 12 is also directed through beamsplitters 38 and 39 to the PD 30.

It should be noted that it is not necessary that the illuminating wavefront be parallel to the optical axis as depicted in FIG. 3 since most targets typically exhibit Lambertian reflectance. This can eliminate the need for the second beamsplitter 39 shown on the right in FIG. 3, leading to higher received signal powers.

The theoretical analysis of the TomICam imaging system, for a single pixel on the CCD/CMOS camera will now be presented. It is to be understood that the measurement is performed across the entire (x,y) array of pixels. To begin with, we assume the swept source, SFL 14, has a perfectly linear chirp of duration T with slope $\xi$ as shown in FIG. 1B, so that the total chirp bandwidth is B=$\xi$T [rad/s]. The optical output is therefore $$e(t) = a\cos\left[\omega_0 t + \frac{1}{2}\xi t^2 + \phi_0\right]. \quad (3)$$

We assume that there exists a multiplicity of reflections incident on this detector pixel from targets at different depths corresponding to time delays $\tau_i$, with (power) reflectivities $R_i$ respectively. Assuming that the power is split equally between the reference (Local Oscillator, or LO) and target arms, the reflected electric field is given by $$e_T(t) = \frac{a}{\sqrt{2}} \sum_i \sqrt{R_i} \cos\left[\omega_0(t - \tau_i) + \frac{1}{2}\xi(t - \tau_i)^2 + \phi_0\right], \quad (4)$$

where we have assumed that the reflectivities $R_i$ are small. If the reflectivities are not small, the reflected light from a farther target is reduced by the reduced transmission through a nearer feature. The frequency (and phase) of the field in the LO arm is shifted by $(\omega_R t + \phi_R)$ using a frequency shifter to yield $$e_{LO}(t) = \frac{a}{\sqrt{2}} \cos\left[(\omega_0 - \omega_R)t + \frac{1}{2}\xi t^2 + \phi_0 - \phi_R\right] \quad (5)$$

Let us assume that an optical shutter in front of the camera ensures that light only falls on the camera over a single chirp duration T. The photocurrent from the pixel is then given by $$i_{\phi_R} = \frac{1}{2T}\int_T (e_T + e_{LO})^2 dt \quad (6)$$

$$= \frac{1}{4}a^2\left(1 + \sum_i R_i + \sum_i \frac{2\sqrt{R_i}}{T}\int_0^T \cos\left[\begin{array}{c}(\omega_R - \xi\tau_i)t + \phi_R - \\ \omega_0\tau_i - \frac{\xi\tau_i^2}{2}\end{array}\right]dt\right).$$

Note that the usual LIDAR frequency shift $\xi\tau_i$ now becomes $(\omega_R - \xi\tau_i)$. The integration over time T accounts for the low speed of the camera, and we have normalized the detector responsivity. We assume that the self-beating terms (the first two terms in (6)) are removed from the measurement as described in the next section, to obtain the beat signal $$I_{\phi_R} = \sum_i \frac{a^2\sqrt{R_i}}{2T}\int_0^T \cos[(\omega_R - \xi\tau_i)t + \phi_R - \phi_i]dt \quad (7)$$

$$= \sum_i \frac{a^2\sqrt{R_i}}{2} \text{sinc}\left(\frac{(\omega_R - \xi\tau_i)T}{2}\right)\cos\left[\frac{(\omega_R - \xi\tau_i)T}{2} + \phi_R - \phi_i\right]$$

$$= \sum_i \frac{a^2 \sqrt{R_i}}{2} \mathrm{sinc}\left(\frac{(\omega_R - \xi\tau_i)T}{2}\right)\cos(\theta_i + \phi_R),$$

where we started by defining the phase $\phi_i = \omega_0 \tau_i + \xi \tau_i^2/2$.

From (7), we see that a non-negligible photocurrent is obtained only if the target location satisfies the condition $$\tau_i = \omega_R/\xi, \quad (8)$$

failing which the sinc function drops to zero, and no image is obtained. The sinc function has a finite width and sidebands, which we will neglect at present. The width of the sinc function determines the axial (range) resolution of the system, and is dependent on the chirp bandwidth. The effect of the sidebands can be mitigated by apodizing the time window of duration T, as will be discussed later. The TomICam therefore captures a slice of the target at a depth determined by the electronic frequency $\omega_R$, which may be varied to obtain a full 3-D image. The tomographic photocurrent is therefore given by $$I_{Tom,\phi_R} = \frac{a^2\sqrt{R_i}}{2}\cos(\theta_i + \phi_R), \quad (9)$$

where it is to be understood that $R_i$ is the reflectivity of a target location that satisfies (8).

Equation (9) shows that the measured current is proportional to the desired measurement of the target reflectivity, but is multiplied by a phase factor which depends on the characteristics of the optical chirp and the target. The phase factor can be calculated, in principle, from the tomographic slice depth and the optical frequency, but it is preferable to eliminate it from the measurement. This is achieved by performing two measurements and varying the reference phase $\phi_R$ by $\pi/2$. The phase shift is achieved readily when a digital or analog electronic oscillator is used to impart the frequency shift in the LO arm. Letting the phase take the values 0 and $\pi/2$ (also called in-phase and quadrature or I/Q measurements), we obtain the desired image $$I_{Tom} = \sqrt{I_{Tom,0}^2 + I_{Tom,\pi/2}^2} = \frac{a^2\sqrt{R_i}}{2}. \quad (10)$$

A perfect image can therefore always be obtained using two consecutive snapshots of the target with a quadrature phase shift between measurements.

Balanced Detection

In the preceding analysis, we have neglected the self-beating terms (i.e. the first two terms) in (6). These terms produce an undesirable background signal that has to be eliminated in order to obtain the useful beat signal. If the reflected signals $R_i$ are weak, which is typically the case, the self-beating terms result in a constant known background level which can be subtracted out. If the reflections are stronger, the self-beating terms depend on the target reflections, and must be separated from the desired beat signal. This can be accomplished in two ways: balanced detection or an additional phased measurement.

Figure 4:
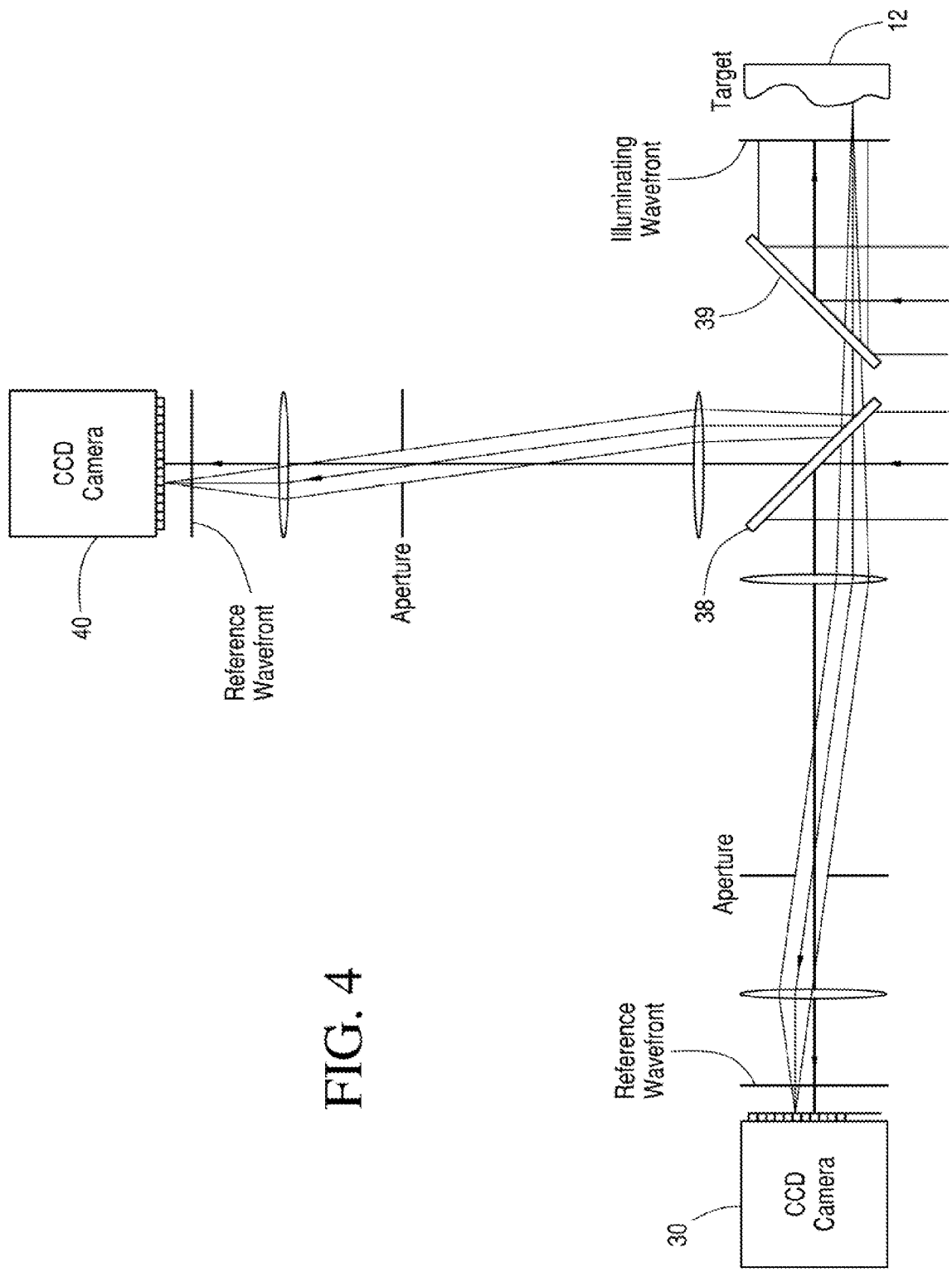
FIG. 4 is a schematic illustration of a modification of the embodiment of FIG. 3 where a second photodetector array is employed to provide balanced detection.

With balanced detection, two sets of detector arrays 30 and 40 are used, one on each output of the first beamsplitter 38 in the system of FIG. 3, as shown in FIG. 4. Assuming the detector arrays 30 and 40 are identical, the currents from the corresponding pixels of the two detectors are given by $$i_{\phi_R,\pm} = \frac{1}{2T}\int_T (e_T \pm e_{LO})^2, \quad (11)$$

so that the beat signal can be recovered according to the relation $$I_{\phi_R} = \frac{1}{2}(i_{\phi_R,+} - i_{\phi_R,-}). \quad (12)$$

The use of two identical detector arrays in a balanced detection scheme may be undesirable in particular applications. We thus present an alternative, electronic, approach for the elimination of self-mixing terms in the photodetector current (6). We have already introduced the concept of changing the phase of the LO signal electronically, in order to change the photocurrent phase. Let us now choose two measurements with the phase of the offset signal being $\phi_R$ and $(\phi_R + \pi)$. From (6), it is clear that changing the phase $\phi_R$ by $\pi$ results in two currents identical to (11), and the beat signal can be recovered according to (12).

We have shown, therefore, that balanced detection can be performed electronically using two consecutive measurements with a 180-degree phase offset instead of two identical optical detector arrays. Combined with the I/Q detection system described in the preceding section, a complete tomographic slice is obtained using four measurements. These four measurements can be any combination of cameras and/or electronic phase shifts. The processor/controller 37 would be programmed to carry out these measurements.

Extension to Nonlinearly Chirped Laser Sources

In the discussion so far, we have assumed that output of the laser source has a perfectly linear frequency vs. time characteristic. This is true of the optoelectronic SFL previously developed [13], but is not the case for commercially available SFL sources. In this section, we show that the TomICam imaging system can be modified to work with nonlinearly swept sources, and electronically controlled one-shot tomographic slices can still be obtained.

We assume that the optical frequency of the chirped source, $\omega(t)$, varies over a bandwidth B over a time T, i.e. $\omega(T) - \omega(0) = B$. We denote the average slope B/T by $\xi$. The optical field is then given by $$e(t) = a\cos[\Theta(t)], \quad (13)$$

where $\Theta$ is the total optical phase. The instantaneous optical frequency is, by definition, $$\omega(t) = \frac{d\Theta}{dt}. \quad (14)$$

The return signal from the target is $$e_T(t) = \frac{a}{\sqrt{2}}\sum_i \sqrt{R_i}\cos[\Theta(t - \tau_i)]. \quad (15)$$

We replace the frequency shifter in the LO arm by a generalized phase shifter with gain K(t) and phase shift $\theta_R(t)$ (e.g. as in FIG. 5), so that $$e_{LO}(t) = \frac{aK(t)}{\sqrt{2}} \cos[\Theta(t) - \theta_R(t)]. \quad (16)$$

The beat signal between the two paths detected at a photodetector (assuming the self-mixing terms are removed as described in the previous section) is $$I = \frac{1}{T} \int_T e_T \cdot e_{LO} \, dt \quad (17)$$

$$= \sum_i \frac{a^2 \sqrt{R_i}}{2T} \int_0^T K(t) \cos[\theta_R(t) - (\Theta(t) - \Theta(t - \tau_i))] \, dt$$

$$= \sum_i \frac{a^2 \sqrt{R_i}}{2T} \int_0^T K(t) \cos\left[\theta_R(t) - \tau_i \frac{d\Theta}{dt}\right] dt$$

$$= \sum_i \frac{a^2 \sqrt{R_i}}{2T} \int_0^T K(t) \cos[\theta_R(t) - \tau_i \omega(t)] \, dt.$$

In deriving Equation (17), we use a first order Taylor series expansion of the optical phase. This is valid for most swept-frequency lasers, since the delays $\tau_i$ are small enough.

Now, let us assume that the phase shifter has the following parameters:

$$K(t) = \frac{T}{B} \frac{d\omega(t)}{dt}, \quad (18)$$

$$\text{and } \theta_R(t) = \tau_0 \omega(t) + \phi_R,$$

where $\tau_0$ is some constant. The beat current in (17) can then be written as $$I_{\phi_R} = \sum_i \frac{a^2 \sqrt{R_i}}{2B} \int_{\omega(0)}^{\omega(T)} \cos[(\tau_0 - \tau_i)\omega + \phi_R] \, d\omega, \quad (19)$$

which after integration becomes $$I_{\phi_R} = \sum_i \frac{a^2 \sqrt{R_i}}{2} \mathrm{sinc}\left[\frac{(\tau_0 - \tau_i)B}{2}\right] \cos\left[\frac{(\tau_0 - \tau_i)(\omega(0) + \omega(T))}{2} + \phi_R\right] \quad (20)$$

$$= \sum_i \frac{a^2 \sqrt{R_i}}{2} \mathrm{sinc}\left[\frac{(\tau_0 - \tau_i)B}{2}\right] \cos[\theta_i + \phi_R].$$

On comparison, we find that Equations (7) and (20) are identical in form. By dynamically varying the gain K(t) and the phase shift $\theta_R(t)$ of the phase shifter in the LO arm of the imaging system, we have exactly reconstructed a tomographic slice using a nonlinearly varying swept-frequency laser. A non-zero value is obtained only for target reflections satisfying $\tau_i = \tau_0$, and the obtained value is given by Equation (9). Further processing using I/Q measurements and/or balanced detection may be used to obtain an accurate tomographic slice.

Figure 5:
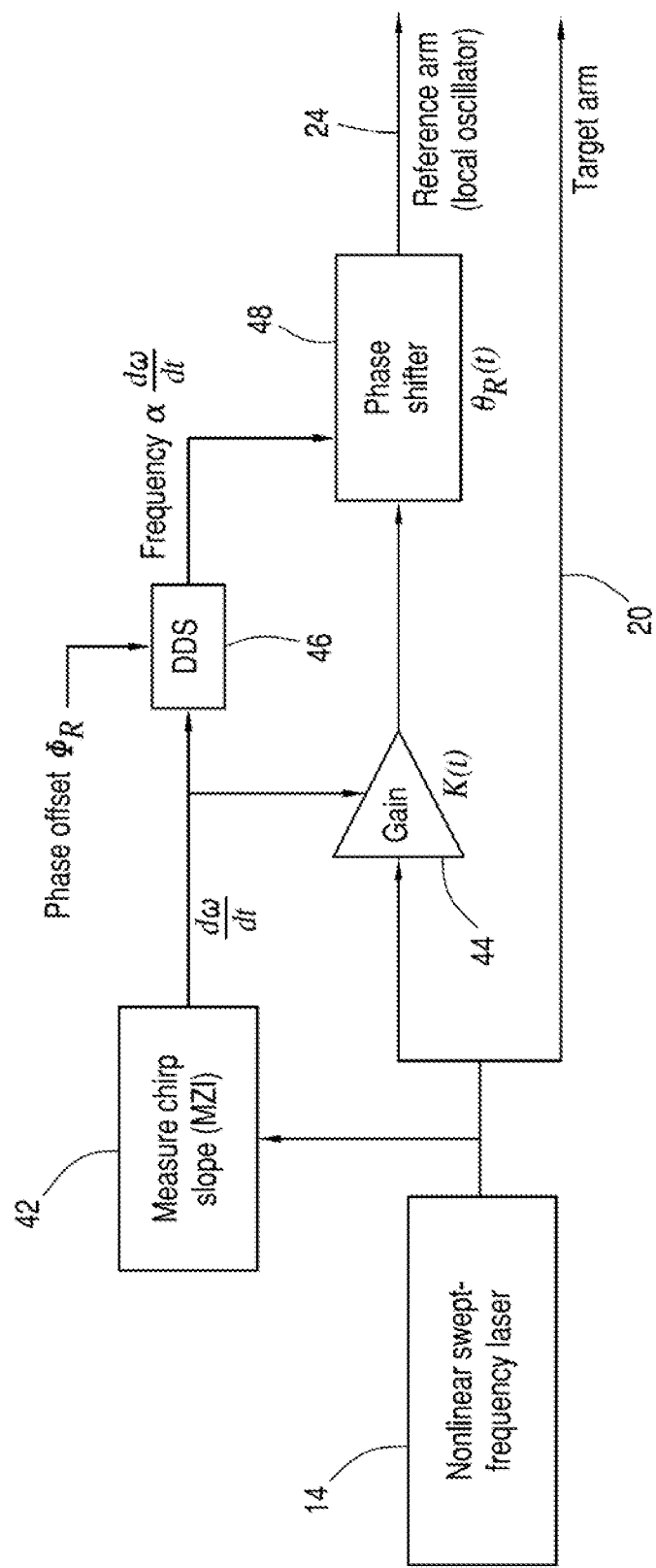
FIG. 5 is a schematic illustration of another modification of the embodiment of FIG. 3 which is configured for use with a nonlinear SFL source and employs a feedforward approach using a Mach-Zehnder Interferometer and a Direct Digital Synthesis (DDS) circuit.

Implementation:

A feedforward technique for the implementation of the nonlinear TomICam imaging system is shown in FIG. 5. A Mach-Zehnder interferometer 42 (along with a photodetector) is used to measure the instantaneous slope of the optical frequency [13]. The measured value of the slope is used to control the gain 44 in the arm according to the first half of Equation (18). Further, a direct digital synthesis (DDS) circuit 46 whose output frequency is proportional to the input control signal is driven by the measured chirp slope. The output of the DDS circuit 46 drives an optical phase shifter 48. This results in an optical phase shift corresponding to the second half of Equation (18). The LO output therefore satisfies (18), resulting in a tomographic slice. The position of the tomographic slice may be moved by simply varying the control input to the DDS circuit 46 by a proportionality factor.

TomICam Implementations and Enhancements

Optical Phase and Amplitude Modulators

The analysis presented above was based on the use of an optical frequency shifter in the LO arm in order to convert the photocurrent frequency to DC. While the frequency shifter presents an intuitively understandable picture, it is not convenient for many reasons. Most importantly, it is not possible to easily realize the optical phase shifts necessary for I/Q detection and balanced detection. Further, frequency shifters such as acousto-optic modulators are not easily integrable with chip-based solutions. However, optical phase and intensity modulators are more attractive solutions, and have the required properties as described below.

Figure 6A:
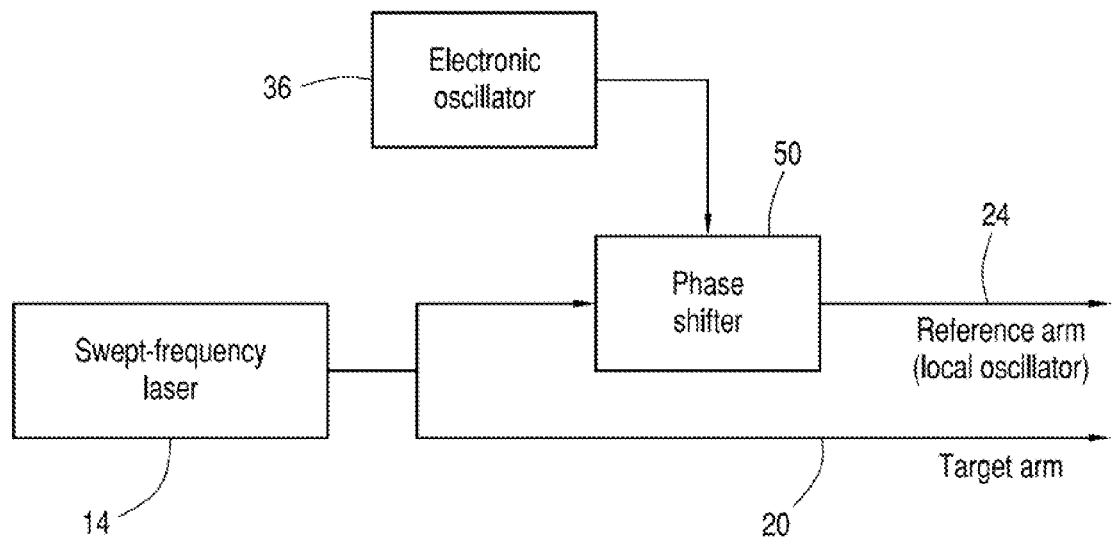
FIGS. 6A and 6B illustrate additional modifications to the embodiment of FIG. 3 which replace the frequency shifter with an optical phase modulator and an optical intensity modulator, respectively.

An optical frequency shift with a precisely controlled phase shift can be obtained using an electronic oscillator 36 to drive a phase shifter 50, as shown in FIG. 6A. The phase shift of the optical reference arm 24 consists of multiple harmonics of the frequency of the electronic oscillator 36. When the fundamental sideband is chosen (or a single-sideband modulator is used), the resultant LO signal is given by Equation (5). No additional filtering is required to choose the first phase-modulation sideband; undesired frequency components are rejected by the low-speed photodetector 30. The electronic oscillator 36 can be a DDS circuit or a voltage controlled oscillator (VCO), both of which afford electronic control over the optical frequency and phase. The use of a phase shifter to compensate for nonlinear source sweeps was described previously. We further note that a separate optical intensity modulator is not necessary, since the modulation depth of the phase-modulation sideband can be varied by changing the amplitude of the electronic signal driving the phase shifter.

Figure 6B:
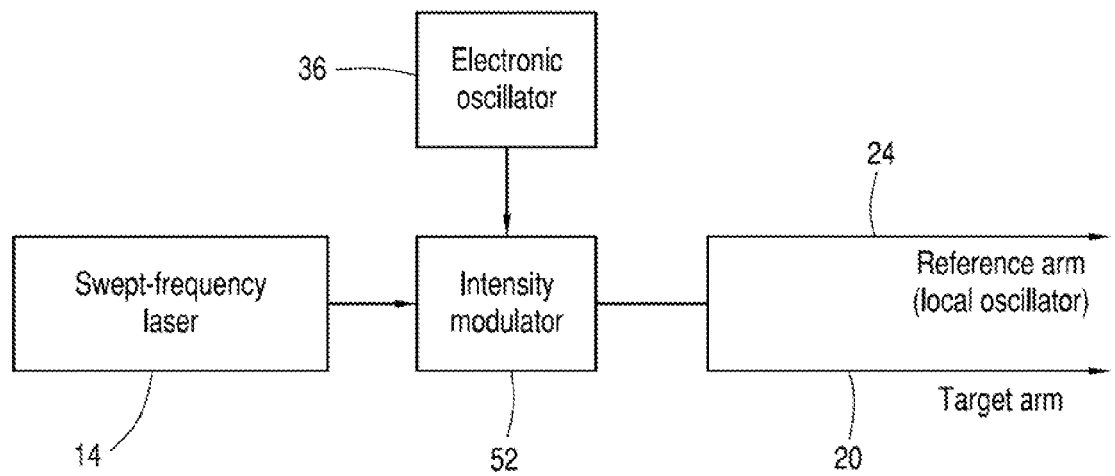

An alternative, perhaps more elegant, approach is based on the use of an intensity modulator 52 before splitting the laser output, as shown in FIG. 6B. This results in an optical intensity modulation of the form:

$$W = a^2 \cos(\omega_R t + \phi_R). \quad (21)$$

When this optical wave passes through the imaging interferometer 16, the resulting photocurrent is given by:

$$i_{\phi_R} = \quad (22)$$

$$\frac{1}{2T} \int_T (e_T + e_{LO})^2 \, dt = \frac{1}{4} a^2 \left( \left(1 + \sum_i R_i\right) \int_0^T \cos^2(\omega_R t + \phi_R) \, dt + \sum_i \frac{2\sqrt{R_i}}{T} \int_0^T \cos(\omega_R t + \phi_R) \cos\left[\xi \tau_i t + \omega_0 \tau_i + \frac{\xi \tau_i^2}{2}\right] dt \right).$$

Again, considering only the beat term, we obtain $$I_{\phi_R} = \sum_i \frac{a^2 \sqrt{R_i}}{4T} \int_0^T \left\{ \begin{array}{l} \cos[(\omega_R - \xi\tau_i)t + \phi_R - \phi_i] + \\ \cos[(\omega_R + \xi\tau_i)t + \phi_R + \phi_i] \end{array} \right\} dt. \quad (23)$$

The second term in the integral is rapidly oscillating and vanishes, leaving us with $$I_{\phi_R} = \sum_i \frac{a^2 \sqrt{R_i}}{4T} \int_0^T \cos[(\omega_R - \xi\tau_i)t + \phi_R - \phi_i] dt, \quad (24)$$

which is identical to Equation (7). In other words, an amplitude modulation sideband may also be used to generate the desired beat signal at the photodetector 30. The use of the intensity modulator 52 is particularly attractive since it can also be simultaneously used as a shutter, and for aperture apodization as described next.

Apodization for Sideband Suppression

The presence of a sinc functional form in Equation (7) is due to the integration over a rectangular aperture (in time) of duration T. The effect of the sidebands can be mitigated by the use of well-known apodization techniques, where the shape of the aperture is changed from a rectangular window to a more smoothly varying function. This apodized time aperture is achieved, for example, by modulating the power in the LO reference arm 24 smoothly using the intensity modulator 52 in FIG. 6B.

Stitching of Multiple SFL Sources

We have recently proposed and demonstrated the stitching of a number of SFL sources in order to obtain a stitched measurement with a larger chirp bandwidth, and thus a better axial resolution [14]. The TomICam technique described here is readily extended to the stitching of a number of SFLs to obtain a higher-resolution full-field tomographic slice in one shot.

In conclusion, the present invention provides a novel optoelectronic technique for one-shot acquisition of a high-resolution tomographic image using a swept-frequency laser and a tomographic imaging camera with no moving parts. We have discussed various features, extensions and potential implementations of the TomICam concept. Although the invention has been disclosed in terms of a number of preferred embodiment and variations thereon, it will be understood that numerous other variations and modifications could be made thereto without departing from the scope of the invention as set forth in the following claims.

References

[1] A. Dieckmann, "FMCW-LIDAR with tunable twin-guide laser diode," *Electronics Letters*, vol. 30, pp. 308-309, 1994.

[2] S. H. Yun, G. J. Tearney, B. J. Vakoc, M. Shishkov, W. Y. Oh, A. E. Desjardins, M. J. Suter, R. C. Chan, J. A. Evans, I.-K. Jang, N. S. Nishioka, J. F. de Boer, and B. E. Bouma, "Comprehensive volumetric optical microscopy in vivo," *Nat Med*, vol. 12, pp. 1429-1433, 2006.

[3] M. A. Choma, K. Hsu, and J. A. Izatt, "Swept source optical coherence tomography using an all-fiber 1300-nm ring laser source," *Journal of Biomedical Optics*, vol. 10, July-August 2005.

[4] S. K. Dubey, T. Anna, C. Shakher, and D. S. Mehta, "Fingerprint detection using full-field swept-source optical coherence tomography," *Applied Physics Letters*, vol. 91, Oct. 29 2007.

[5] C. Ndiaye, T. Hara, H. Ito, and Ieee, "Profilometry using a frequency-shifted feedback laser," in 2005 *Conference on Lasers & Electro-Optics*, 2005, pp. 1757-1759.

[6] M. C. Amann, T. Bosch, M. Lescure, R. Myllyla, and M. Rioux, "Laser ranging: a critical review of usual techniques for distance measurement," *Optical Engineering*, vol. 40, pp. 10-19, January 2001.

[7] M. K. K. Leung, A. Mariampillai, B. A. Standish, K. K. C. Lee, N. R. Munce, I. A. Vitkin, and V. X. D. Yang, "High-power wavelength-swept laser in Littman telescope-less polygon filter and dual-amplifier configuration for multichannel optical coherence tomography," *Optics Letters*, vol. 34, pp. 2814-2816, Sep. 15 2009.

[8] S. H. Yun, C. Boudoux, G. J. Tearney, and B. E. Bouma, "High-speed wavelength-swept semiconductor laser with a polygon-scanner-based wavelength filter," *Optics Letters*, vol. 28, pp. 1981-1983, Oct. 15 2003.

[9] R. Huber, M. Wojtkowski, and J. G. Fujimoto, "Fourier Domain Mode Locking (FDML): A new laser operating regime and applications for optical coherence tomography," *Optics Express*, vol. 14, pp. 3225-3237, Apr. 17, 2006.

[10] C. Chong, T. Suzuki, A. Morosawa, and T. Sakai, "Spectral narrowing effect by quasi-phase continuous tuning in high-speed wavelength-swept light source," *Optics Express*, vol. 16, pp. 21105-21118, Dec. 8, 2008.

[11] J. C. Marron and K. W. Gleichman, "Three-dimensional imaging using a tunable laser source," *Optical Engineering*, vol. 39, pp. 47-51, January 2000.

[12] M. L. Simpson, C. A. Bennett, M. S. Emery, D. P. Hutchinson, G. H. Miller, R. K. Richards, and D. N. Sitter, "Coherent imaging with two-dimensional focal-plane arrays: design and applications," *Appl. Opt.*, vol. 36, pp. 6913-6920, 1997.

[13] N. Satyan, A. Vasilyev, G. Rakuljic, V. Leyva, and A. Yariv, "Precise control of broadband frequency chirps using optoelectronic feedback," *Optics Express*, vol. 17, pp. 15991-15999, Aug. 31, 2009.

[14] A. Vasilyev, N. Satyan, S. Xu, G. Rakuljic, and A. Yariv, "Multiple source frequency-modulated continuous-wave optical reflectometry: theory and experiment," *Applied Optics*, vol. 49, pp. 1932-1937, Apr. 1, 2010.

The invention claimed is:

1. An apparatus for detecting the range of one or more targets comprising:
a swept frequency laser source for generating an output launched laser beam whose frequency varies as a function of time over a predetermined optical bandwidth;
an interferometer for receiving said launched laser beam and dividing said laser beam into a target beam and a reference beam, said interferometer including a first, target arm for directing said target beam to a target whose range is to be determined, receiving a reflected target beam from said target; a second, reference arm for transmitting said reference beam; and a combiner for combining said reference beam in said reference arm with said reflected target beam in said target arm and forming a combined output beam;
means for modulating at least one of said target beam and said reference beam to reduce the relative difference between a frequency of the reflected target beam and a frequency of the reference beam; and
an optical detector for receiving said combined output beam and generating an output signal from said photodetector that indicates the range of said target based on the reduced difference in frequencies between said reflected target beam and said reference beam.

2. The apparatus of claim 1, wherein said means for modulating at least one of said target and said reference beams comprises a frequency shifter.

3. The apparatus of claim 1, wherein said swept frequency laser source generates an output launched laser beam whose frequency varies linearly with time.

4. The apparatus of claim 1, wherein said optical detector is a low frequency detector selected from the group including a CCD detector and a CMOS detector.

5. The apparatus of claim 1, further including means for eliminating self-mixing terms in the output signal of said photodetector.

6. The apparatus of claim 5, wherein said means for eliminating self-mixing terms in the output signal of said photodetector comprises a second photodetector.

7. The apparatus of claim 5, wherein said means for eliminating self-mixing terms in the output signal of said photodetector comprises means for making two measurements 180 degrees out of phase with one another.

8. The apparatus of claim 1, further including means for eliminating a phase factor in the output signal of said photodetector.

9. The apparatus of claim 8, wherein said means for eliminating the phase factor in the output signal of said photodetector comprises means for making two measurements 90 degrees out of phase with one another.

10. The apparatus of claim 1, further including means for eliminating self-mixing terms and a phase factor in the output signal of said photodetector.

11. The apparatus of claim 10, wherein said means for eliminating self-mixing terms and the phase factor in the output signal of said photodetector comprises means for making four measurements 90 degrees out of phase with one another.

12. A method for detecting the range of one or more targets comprising the steps of:
generating an output launched laser beam whose frequency varies as a function of time over a predetermined optical bandwidth;
dividing said launched laser beam into a first, target beam and a second, reference beam;
changing the optical frequency of at least one of said target and reference beams to reduce the relative difference between that target beam frequency and the reference beam frequency after that target beam has been transmitted to and received back from a target;
directing said target beam to a target whose range is to be determined;
receiving said target beam after being reflected by said target;
combining said reference beam with said reflected target beam to form a combined output beam;
optically detecting said combined output beam with a photodetector; and
generating an output signal from said photodetector that indicates the range of said target based on the reduced difference in frequencies between said reflected target beam and said reference beam.

13. The method of claim 12, wherein the step of changing the optical frequency of at least one of said target and said reference beams comprises passing said at least one of said target beam and said reference beam through a frequency shifter.

14. The method of claim 12, wherein the frequency of said output launched laser beam varies linearly with time.

15. The method of claim 12, wherein said optical detector is a low frequency detector selected from the group including a CCD detector and a CMOS detector.

16. The method of claim 12, further comprising the step of eliminating self-mixing terms in the output signal of said photodetector.

17. The method of claim 16, wherein said step of eliminating self-mixing terms in the output signal of said photodetector is carried out by using a second photodetector.

18. The method of claim 16, wherein said step of eliminating self-mixing terms in the output signal of said photodetector comprises making two measurements 180 degrees out of phase with one another.

19. The method of claim 12, further including the step of eliminating a phase factor in the output signal of said photodetector.

20. The method of claim 19, wherein said step of eliminating the phase factor in the output signal of said photodetector comprises making two measurements 90 degrees out of phase with one another.

21. The method of claim 12, further including the step of eliminating self-mixing terms and a phase factor in the output signal of said photodetector.

22. The method of claim 21, wherein the step of eliminating self-mixing terms and the phase factor in the output signal of said photodetector comprises making four measurements 90 degrees out of phase with one another.

* * * * *